United States Patent [19] [11] 4,320,036
Gobran et al. [45] Mar. 16, 1982

[54] LIGNO-NOVOLAK RESIN MOLDING COMPOSITIONS

[75] Inventors: Riad H. Gobran, New Hope; Akio Takahashi, Solebury, both of Pa.; Eugene P. Reilly, Lawrenceville, N.J.

[73] Assignee: American Can Company, Greenwich, Conn.

[21] Appl. No.: 197,479

[22] Filed: Oct. 16, 1980

[51] Int. Cl.³ .................. C08G 8/28; C08H 5/02
[52] U.S. Cl. .................. 524/14; 527/403; 524/594
[58] Field of Search .................. 260/17.5, 17.2

[56] References Cited

U.S. PATENT DOCUMENTS 2,956,033 10/1960 Apel .................. 260/17.5
3,090,700 5/1963 Ball et al. .................. 260/17.5 X
3,185,654 5/1965 Ball et al. .................. 260/17.5
3,216,839 11/1965 Webster .................. 260/17.5 X Primary Examiner—Earl A. Nielsen
Attorney, Agent, or Firm—Robert P. Auber; Stuart S. Bowie; Ernestine C. Bartlett

[57] ABSTRACT

Ligno-novolak resins, either in the form of physical blends of lignin and novolak resins or as synthetically derived from the reaction of lignin, phenol and an aldehyde in the presence of an acidic catalyst, are provided. The resins, including the physical blends, are curable to thermoset, substantially completely cross-linked resins in which the lignin is interreacted and cross linked through the action of a curing agent such as hexamethylenetetramine. The resins are useful in the production of molding compounds that exhibit properties that are at least comparable to those of compounds derived from novolak resins. Moreover, excellent heat deflection temperatures and superior electrical properties are exhibited by such molding compounds.

20 Claims, No Drawings

LIGNO-NOVOLAK RESIN MOLDING COMPOSITIONS

BACKGROUND OF THE INVENTION

1. Prior Art

The prior art is believed to be best exemplified by the following patents and literature references:

Hochwalt et al, U.S. Pat. No. 2,168,160, July 1939, and Hochwalt et al., U.S. Pat. No. 2,282,518, May, 1942, relate to production of phenol-aldehyde-lignin resins that are useful in molding compounds and in which lignin containing about 80% by weight water or a desulfonated lignosulfonate is dissolved in phenol, admixed with aldehyde and heated to effect condensation in the presence of either an acid or alkaline catalyst. The references appear to involve condensations of the resole type.

Ball, U.S. Pat. No. 3,185,654, May, 1965, relates to reaction of lignin with phenol-formaldehyde A-stage resin to produce resole type resins.

Salimsakov et al., *Plast, Massy*, 12, 61–3 (1973) [Chemical Abstracts, 78, 112897a, 1973], relates to the use of hydrolysis lignin as a filter for phenol-formaldehyde resins in the production of molding powders.

Doi et al., Japan No. 70/20,308, July (1970) [Chemical Abstracts 74, 64926s (1971)], relates to rapid curing phenolic varnishes produced by reaction of phenol, formaldehyde, toluenesulfonamide and lignin in the presence of a basic catalyst followed by incorporation of hexamethylenetetramine in the resin thus obtained.

Kalnins et al., *Akad. Nauk. Lalv.*, SSR, 24, 65–70 (1962) [Chemical Abstracts, 58, 5880b (1963)], prepared molding powders by precipitation of lignin from spent hydrotropic liquor and reaction of the lignin with phenol to form a condensate followed by reaction of the condensate with formaldehyde to form novolak resins.

Apel et al., U.S. Pat. No. 2,956,033, November, 1960, relates to phenol-aldehyde-lignin resins of the novolak type suitable for molding prepared from "low temperature" lignin obtained as a waste product in a saccharification process. A phenol-formaldehyde condensate is first produced which is then reacted with phenol, sulfuric acid and hydrolysis lignin. The particular hydrolysis lignin is disclosed to be critical and other hydrolysis lignins are said to be unsuitable in the process.

Clark, U.S. Pat. No. 2,520,913, September/1950, relates to production of a resin from reaction of cresylic acid, phenol and formaldehyde and, optionally, hydrolysis lignin, obtained by the saccharification of corn cobs, in the presence of sulfuric acid. The resultant resin is neutralized, washed with water, and compounded with hydrolysis lignin and hexamethylenetetramine to produce a molding material.

Donahue et al., *Plastics*, 1, No. 2,45,101 (1944) discloses hydrolysis lignin as a filler in phenol-formaldehyde molding compounds.

Mori et al., *Hokkaidoritsu Rinsan Shikenjo Kenkyu Hokoku* 1969, No. 53, 45–81 (Japan) [Chemical Abstracts 74, 127848r, (1971)] relates to production of foamable lignin resins by resole type condensation of alkali lignin with formaldehyde and phenol.

Popova et al., Tezisy Dokl.—Vses. Konf. Khim. *Ispol'z Lignina*, 6th, 1975 (Pub. 1976), 160–3 (Russia) [Chemical Abstracts 86, 173343t (1977)], discloses compression molding compositions derived from a powdered composition of sawdust, phenol, formaldehyde and HCl.

Grigor'ev et al., *Tr. Leningrad. Tecknol. Inst. Tsellyul.—Bum. Prom.* No. 21, 199 (1968) [Chemical Abstracts, 71, 72120c (1969)], relates to studies of condensation products of lignin and ammonium lignosulfonate with phenol and formaldehyde.

2. Field of the Invention

This invention relates to ligno-novolak resin blends and synthetic ligno-novolak resins; to molding compositions derived from such resins and resin blends; and to cured, crosslinked derivatives of such resins and resin blends.

Lignin is derived from wood as a by-product in the pulping process and, as an abundant, natural and renewable product, it has tremendous potential for many industrial uses as a replacement for increasingly scarce and expensive petroleum based materials. Lignin has found limited utilization commerically, however, because it is complex chemically and physically and its characteristics have been found to vary considerably, depending on many factors including variation in pulping conditions, the kind of wood being pulped, the conditions under which it is recovered, etc.

It is known that lignin obtained as a by-product in alkaline pulping processes contains both aliphatic and aromatic hydroxyl groups that are attractive sites for chemical modifications. Indeed, because of the well known guaiacyl moiety present in lignin and its derivatives, lignin has been proposed as a replacement for phenol in the production of phenolic resins. In view of the ever-rising cost of phenols and potential shortages due to diminishing resources, the use of such lignin substitutes from renewable and natural sources becomes increasingly more attractie.

One technological area in which lignin has been proposed as a phenol substitute has been in the production of phenol-formaldehyde type resins. These resins have generally been categorized as "resoles", i.e., resins produced from reaction of a molar excess of formaldehyde with phenol, normally in the presence of alkaline catalysts and curable without the necessity of a curing agent, or "novolaks", i.e. resins produced from reaction of a molar excess of phenol with formaldehyde generally in the presence of an acid catalyst, and curable in the presence of a substantial quantity of a curing agent such as hexamethylenetetramine.

Where lignin has been proposed in the production of novolak resins for molding compounds, it has in general been viewed as a filler or it has been employed as a reactant, replacing a portion of the phenol being reacted with formaldehyde. Many of such prior proposals employ hydrolysis lignin for such purposes. Such hydrolysis lignin is a highly purified material derived from acid hydrolyzates which are in turn derived by digestion of lignocellulosic materials with dilute aqueous acid at temperatures ranging from about 190° to 225° C. and pressures of about 200 to 400 psi, normally under the action of injected steam. The acid hydrolyzates will contain sugars such as xylose or glucose, furfural, humins, lignin decomposition products such as vanillin or other aromatic compounds. Hydrolysis lignin is the solid left in the hydrolyzate after separation of the sugars and other components. In other words, hydrolysis lignin is a highly purified, chemically altered lignin material. Alkali or Kraft lignin, on the other hand, is obtained as a by-product of alkaline pulping using either the soda process in which the pulping liquor contains sodium hydroxide or the sulfate process, wherein the pulping liquor contains both sodium hydroxide and sodium sulfide. During the pulping process, the lignin becomes dissolved in the pulping liquor as a salt of lignin and is conventionally recovered by acid precipitation as either free lignin or as a lignin salt depending upon the specific conditions under which the lignin is obtained. The two types of lignin materials, i.e., alkali lignin and hydrolysis lignin, are quite different as is well recognized in the art.

Heretofore, whether the phenol replacement has been proposed in the synthesis of resole or novolak resins employing hydrolysis lignin or otherwise, there has been little or no commercial use of lignin in the production of such resins. This has primarily been the result of processing difficulties that have been encountered, such as slow cure, high water absorptivity, plating out in the molding process, etc., as well as adverse effects upon the properties as compared with the properties of the resins produced without phenol replacement.

It would, of course, be desirable to optimize and, indeed, improve the properties of novolak type resinous products while also realizing the cost savings that are possible through utilization of a less expensive substitute. Moreover, it would be most advantageous to achieve such optimization and savings in a manner that is versatile, convenient and straightforward, and that requires no special or expensive equipment or procedures to carry out.

Accordingly, a primary object of the present invention is to provide a novel formulation for producing a thermoset lignin/phenol/aldehyde resin of the novolak type that exhibits desirable properties and in which lignin is interreacted and crosslinked.

Another objective of the present invention is to provide novel lignin/phenol/aldehyde resins suitable for use in the production of molding compounds.

Another object of the invention is to provide novel novolak molding compounds comprised of such ligno-novolak resins, which compounds exhibit properties that are at least equivalent, and in some respects superior, to those of conventional novolak molding compounds.

It is also an object of the invention to provide such formulations and molding compounds which exhibit desirable processing and molding characteristics.

Yet another object of the invention is to provide such formulations and molding compounds which can be produced in a manner that is both versatile and convenient and also relatively inexpensive.

SUMMARY OF THE INVENTION

It has been discovered that ligno-novolak resins can be employed to produce molding compounds suitable for compression molding and possessing acceptable water absorptivity and mechanical strength, higher heat deflection temperatures and superior electrical properties compared to those of commercial novolak molding compounds. Moreover, it has been found that such compounds may be produced from ligno-novolak resins derived either through substitution of lignin for a portion of the phenolic component in the conventional novolak synthesis or by replacement of a portion of the novolak resin with lignin by physically blending the two materials.

To our knowledge, no ligno-novolak molding compounds have heretofore been produced wherein the overall properties are at least comparable and the electrical properties are superior to those obtained with commercial novolak resins.

It was particularly unexpected to discover that ligno-novolak resins possessing such attributes could be prepared by physically blending a lignin material, a novolak resin and a curing agent resulting in a cross-linked, coreacted material in which lignin is present, not as a filler, but as a coreacted thermoset matrix with the novolak resin in the molded product.

In its most preferred embodiments, the invention comprises:

A. Ligno-novolak resin blend formulations (and the cured, coreacted, cross-linked products thereof) comprising a physical admixture of from (a) about 5 to about 50 weight percent of alkali lignin, preferably 10 to 40 percent; (b) about 50 to about 95 weight percent, preferably 60 to 90 percent, of a novolak resin; and (c) a curing agent.

B. Ligno-novolak resins (and the cured, cross-linked products thereof) comprising (a) the reaction product of alkali lignin, a molar excess of phenol, and formaldehyde in the presence of an acid catalyst, the lignin replacing from about 5 to 50 weight percent of the phenol and preferably from about 10 to 40 weight percent of the phenol; and (b) a curing agent.

C. Molding compounds derived from such ligno-novolak resins and resin blends and especially wood flour filled general purpose compression molding compounds, i.e., ASTM Type II molding compounds.

In the blends, the lignin and novolak components are capable of polymerization and/or cross-linking to higher molecular weights upon activation with the curing agent. Similarly, the synthetic resins are capable of further polymerization and/or crosslinking to higher molecular weights in the presence of a curing agent. In both embodiments, the curing agent is present in an amount sufficient to effect substantially complete cross-linking of the resultant ligno-novolak resin and preferably is present in an amount of about 5 to 20 percent based on the weight of the ligno-novolak resin or resin blend.

DETAILED DESCRIPTION OF THE PREFERRED EMBODIMENTS

Lignin suitable for use in this invention is alkali or Kraft lignin recovered from sulfate or soda pulping processes and preferably recovered from such processes by acid precipitation at a pH varying from as high as about 9 to as low as about 2 or lower depending on the desired end use of the resultant molding compound. Such acid precipitation may be accomplished by the introduction of acids, such as $CO_2$, $H_2SO_4$, $HCl$ and other conventional mineral acids as well as organic acids such as acetic and formic, to the black liquor to effect the precipitation of the lignin followed by washing the lignin with neutral or acid water thereby providing lignin containing a suitable ash content. Ash is present mainly in the form of hydrophilic salts, e.g., principally as sodium phenate when the lignin is precipitated at pH 8-9 and principally as sodium sulfate when the precipitation is at pH 3-4. Such hydrophilic salts convey a degree of water absorptivity which may in turn increase the softening point of the lignin and result in poor processability of molding compounds.

Softening points indicate the minimum temperature at which the resins can be processed. As used herein, the closer the softening point to that of commercial novolak resins, the better the processability of the resins is deemed to be. The control resin, Durez 19896 for example, exhibits a softening point of about 85–90° C. In general, the softening points of the ligno-novolak resins of the invention depend on the level of lignin present, the aldehyde to phenol mole ratio for the synthetic resins and the softening point of the novolak present in the blend as well as the ash content of the total lignin. Thus the ash content of the lignin is a relevant consideration in the successful practice of the invention. The ash content can be controlled through selection of the pH at which the lignin is precipitated. Precipitation at higher pH will produce higher ash contents while lower pH precipitation will produce lower ash contents. The ash content may also be controlled by subjecting the lignin to acid washings. For example, the precipitated lignin may be washed as thoroughly as may be practical so as to ensure the removal of salts. Additionally, the ash content of the resins employed to produce the molding compounds will be related to the amount of lignin present in the total resin and may also be kept within tolerable limits through adjustment of the relative proportions of the components in the blend or of the reacting components in synthesizing the resins. In the preferred embodiments, the lignin will be precipitated at sufficiently low pH and/or will be subjected to sufficient acid washings to have an ash content that does not exceed about 1 to 7 percent based on the weight of the total lignin.

Lignosulfonates have inherently high water absorptivity and softening points and are therefore not useful per se as lignin materials in this invention. However, such lignosulfonates that have been substantially desulfonated may be employed, if desired. Alkali lignin is the preferred lignin material.

The novolak resins utilized in forming the ligno-novolak blends are well known in the art and may be produced by known methods. In general, such resins will be produced by an acid catalyzed condensation of a stoichiometric excess of a phenolic material with an aldehyde. Suitable phenolic materials may be selected, for example, from the group of phenol, cresol, cresylic acid and xylenols with phenol being the preferred reactant. The aldehyde components may be desirably selected, for example, from the group of formaldehyde, furfural, paraformaldehydes, etc. with formaldehyde being the preferred reactant. In general, molar ratios of formaldehyde to phenol of about 0.5 to 0.9 and preferably about 0.75 will be employed. The preferred novolak resins will be those produced through reaction of phenol and formaldehyde. The condensation may be permitted to proceed to any molecular weight from which the resultant novolak resin is curable or capable of further polymerization or cross-linking in the presence of a curing agent. Preferably, such novolak resins will have molecular weights within the range of about 500 to about 2,000 and especially from about 700 to about 1,500.

Ligno-novolak resins of the invention may be produced from blends of lignin and the novolak by any convenient means permitting thorough and intimate mixing. In the preferred embodiment, the resins are ground together, for example, ball-milled, for the time necessary to provide a suitable intimate admixture. Alternatively, the resins may be milled together, melted at a suitable temperature, cooled and remilled to insure intimate mixing.

The synthetically produced ligno-novolak resins of the invention may be produced in substantially the same way as the novolak resins discussed above except that lignin will be substituted for a portion of the phenol reactant. Molar ratios of formaldehyde to phenol of about 0.5 to 0.9 and preferably about 0.7 will be employed. Since Kraft lignins possess much higher softening points than commercial novolaks, ligno-novolaks synthetically produced are desirably obtained at lower formaldehyde to phenol molar ratios to minimize differences in processability of the blend resins and the commercial novolak resins. Preferably such resins are also ground (ball milled) or reduced in size prior to being combined with the curing agent.

It is also preferred that both the ligno-novolak resin blends and the synthetically derived resins be adequately dried to keep the moisture content of the molding compounds derived therefrom at a preferred level.

Molding compounds may be produced from the ligno-novolak resins or resin blends by means well known in the art. Preferably, the ligno-novolak resins or resin blends, in powder form, are mixed with desirable lubricants, fillers, curing agents and other conventional molding compound additives in a suitable blender or mixing device with griding, if desired. In the preferred embodiment, a 7×16 inch rubber mill, set for 270° F./132° C. (both rolls) was employed. A 500 gram charge of formulation was poured onto rotating rolls, worked for 45 seconds and removed from the roll as a sheet. The sheet was cooled and chopped to pass through a 10 mesh screen.

Compression molding was used for all tests herein. Mold temperature was 170° C.; molding time was 5 minutes; and mold pressure was 2,500 psi. Specimens were molded from preforms in a 4×6 inch shallow, positive pressure mold. Preforms were made by compressing pellets of the molding compounds in a 4×6 inch mold at 70° C.

Any curing agent known in the art to be effective for curing novolak resins may be employed herein to cure the ligno-novolak resins of the invention. Such compounds may advantageously be selected from the group of hexamethylenetetramine, paraformaldehyde, or any other compounds that are capable of generating formaldehyde at molding temperatures. Hexamethylene tetramine is the preferred curing agent.

Exemplary of the efficacy of the present invention are the following examples, wherein all parts specified are on a weight basis, unless expressly stated to the contrary. The lignins utilized therein are prepared as follows:

To provide a suitable softwood lignin, a 5-kilogram sample of softwood lignin having a moisture content of 47 percent and an ash content of 7 percent is charged into a 10-gallon reactor containing 20 liters of water at 70° C. Sodium hydroxide is added, with stirring, in the amount of 150 grams, and the resultant solution is maintained at 75° to 80° C. while a 50 percent sulfuric acid solution is added to adjust the pH to a value between 2 and 3, and to thereby effect precipitation of the lignin product. Upon filtering, washing with hot water (to remove substantially all uncombined sulfate), and drying in a circulating oven at 40° C., a yield of 2440 grams of lignin is obtained. The softening point of the product is 230° to 250° C., and its ash content is less than 1 percent.

A suitable hardwood lignin product is prepared by charging approximately 20 gallons of hardwood black liquor (16.5 weight percent solids) to a 30-gallon reactor. The liquor is heated with steam, through a stainless steel coil, to about 70° C., and is vigorously stirred while concentrated sulfuric acid is added to produce a pH value just under 4. Lignin is recovered from the resultant slurry by hot filtration, and the product is thereafter washed with hot water until determined to be free of uncombined sulfate. After drying in a circulating air oven at 40° C., the yield of lignin is found to be 3142 grams; the material has a softening point of approximately 160° C. and an ash content of less than 1 percent.

EXAMPLE ONE

A. Blends

Two ligno-novolak blends are prepared, each containing 25 weight percent of one of the foregoing lignins. Specifically, 795 grams of the selected lignin is charged into a large ball mill with 2384 grams of DUREZ 19896 (all DUREZ products referred to herein are commercial novolak resins available from the Hooker Chemical Company) and suitable grinding media such as, for example, steel balls. After 20 hours of milling, the balls are removed and the resultant blend is dried for 20 hours in a circulating air oven at 40° C. A sample of the blend is fused in a small beaker and is thereafter cooled and crushed; softening point and gel time determinations are made with the samples. The softwood lignin blend is found to have a softening point of 114° and 118° C., and the hardwood lignin blend is found to have a softening point of 107° to 109° C. Mixing the hardwood blend with 15 percent of hexamethylenetetramine to cause cross-linking results in gel times of 187 and 59 seconds at 135° and 165° C., respectively; the softwood blend containing the same amount of the curing agent exhibits a gel time of 57 seconds at 165° C.

B. Synthetic Resins

To produce a 25 weight percent sythetic softwood ligno-novolak product, 900 grams of phenol is introduced into a three-liter kettle equipped with a stirrer, two reflux condensers, a thermometer, and an oil heating bath. The reactor is brought to a temperature of about 55° to 65° C., following which 334 grams of a softwood Kraft lignin, precipitated at a pH of 8 to 9 and ground and dried, is added; the lignin has an ash content of 7 percent and a water content of 3.5 percent, thus providing 300 grams of lignin on a dry, ash-free basis. A solution consisting of 40 grams of 96 percent sulfuric acid and 672 grams of 37 percent formaldehyde is then added to the phenol and lignin in the reaction kettle. The reaction mixture is then heated to a temperature of about 100° C., and maintained at approximately that temperature, under refluxing conditions, for a total period of approximately 1.5 to 1.6 hours, following which the sulfuric acid is neutralized with calcium hydroxide. Thereafter, the contents of the kettle are heated to strip the volatiles, the latter phases of the stripping operation being effected under vacuum. After the pressure over the reaction mixture has been reduced to 100 millimeters and the temperature has risen to 120° C., the reaction is deemed to be essentially complete; the total period of the reaction is approximately five hours. The contents of the reactor are finally cooled in a stainless steel tray, and the cooled product is ground in a ball mill and air dried at 40° C.

A hardwood synthetic ligno-novolak is prepared in much the same manner, utilizing 900 grams of phenol, 306 grams of hardwood Kraft lignin (300 grams on a dry basis), 626 grams of 37 percent formaldehyde and 12 grams of 98 percent sulfuric acid. Although slight variations are made in the specific conditions of reaction, ultimately the product recovered is ground and dried, and is utilized in evaluations.

The softwood ligno-novolak resin is found to have a softening point of 98° to 101° C. and the hardwood ligno-novolak resin is found to have a softening point of 92° to 95° C. Mixing the hardwood resin with 15 percent of hexamethylenetetramine results in gel times of 190 and 58 seconds at 135 and 165° C., respectively.

Gel times of the resin are significant indicators of processability and moldability. Since phenolic resins are thermosetting resins, the resin must be reasonably stable with respect to cross-linking at the processing temperature but rapidly cross-linked at the higher temperature of molding. The lower temperature gel time is a measure of the "barrel life" and the longer this time, the better the processability of the resin. The higher temperature gel time is a measure of how fast an article can be molded and is desirably as fast as possible.

In these examples, the gel times at 165° are an indication that moldability of the ligno-novolak resins, whether derived synthetically or by blending, is superior to that of the commercial novolak Durez 19896 which has a gel time at 165° C. of 70 seconds.

It was found that at the processability gel times, e.g., 190 seconds at 135° C., the presence of moisture decreases the gel time of both the ligno-novolak resins and the commercial novolak. Therefore, it is preferred that the ligno-novolak resins be dried prior to processing to ensure the processing times that are desirable. Gel times at 165° were not affected by moisture.

Processability of the two resin blends and of the two synthetic resins is evaluated by first compounding each of them on a 7 inch by 16 inch rubber mill, with both rolls heated to 132° C. Each of the resin blends and resins is mixed with an equal weight of wood flour, curing agent and other compounding additives; a half-kilogram charge of the filled mixture is deposited upon the rotating rolls, and the charge is worked for a period of approximately 45 seconds after banding of the material is first observed (normally about 7 seconds after milling is commenced). The product is removed as a sheet, which is then cooled and chopped to a 10-mesh particle size. The ability of the material to form a well-fused and smooth band around the mill roll in a reasonably short period of time and without excessive cross-linking is indicative of good processability. Each of the filled molding compounds perform well in this regard, with the millability of the softwood blend being particularly excellent.

Processability is further evaluated utilizing a Brabender blender fitted with No. 6 "roller" mixing blades and a 60 milliliter bowl preheated with oil at a temperature of 125° C. After charging 50 grams of the filled blend or resin into the Brabender bowl, and commencing rotation of the blades at 15 revolutions per minute, the associated timing chart is started. The periods which elapse before curing is complete (crumble time) are taken as indicative of the barrel or pot life of the compound, with longer periods being desirable to afford more time for processing. The minimum torque value is also noted, with the lower torques indicating greater ease of processing, and hence being the more desirable since less energy input is required.

Moldability of material is determined using a Molding Index, or cup flow test, carried out in accordance with the procedure of ASTM D731. Specifically, the cup mold is heated to 165 degrees Centigrade, the selected maximum pressure point is set, 38 grams of the filled molding compound is charged into the unit, and closing of the mold is effected. After four minutes, the molded cup is removed, and the thickness of the flash along the upper lip is measured. If the flash is more than 8-mils thick, progressively higher pressures are utilized for subsequent runs until the minimum pressure capable of producing an 8-mils thick flash has been determined.

A short closing time is indicative of a faster, and hence more desirable, molding cycle, and the benefits of minimizing the pressure required to effect molding are obvious.

For purposes of comparison, a molding compound based on the same commercial novolak and processed in the manner described but formulated without any lignin was evaluated in the same way. The results were as set forth in Table I which follows.

EXAMPLE TWO

A number of test specimens are produced by utilizing preforms made by pressing pellets of the molding compound into a 4 inch by 6 inch mold at a temperature of 70 degrees Centigrade. The molding composition comprises a physical blend of 75 parts by weight of DUREZ 19896 and 25 parts by weight of either a hardwood or a softwood lignin prepared in the manner hereinabove described or 100 parts of a 25% replacement level softwood or hardwood ligno-novolak resin prepared in the manner described above. In addition to the resinous components, the molding compounds contain 15 percent, based upon the weight of the ligno-novolak resin or resin blend, of the hexamethylenetetramine crosslinking agent, and are filled with wood flour in an amount equal to the weight of novolak resin or resin blend. Specimens measuring 4 inches by 6 inches by ¼ inch are produced by compression molding of the preforms at a temperature of 170 degrees Centigrade and a pressure of 2,500 psi for a period of five minutes; in accordance

TABLE I

PROCESSABILITY AND MOLDABILITY OF LIGNO-NOVOLAK RESINS

| Resins | Brabender Test at 125° C. | | | Cup Flow Tests at 170° C. | | |
| --- | --- | --- | --- | --- | --- | --- |
| | Cure Start, (min.) | Minimum Torque, (M-g) | Crumble Time, (Min.) | Time To Close Press, (Sec.) | Minimum Mold Press (p.s.i) | Surface Gloss |
| Durez 19,896 (Control) | 5.2 | 3850 | 7.2 | 24 | 7,000 | Good |
| A. Blends | | | | | | |
| Softwood Lignin-Durez 19896 | 4.5 | 3400 | 10.4 | 35 | 10,000 | Excellent |
| Hardwood Lignin-Durez 19896 | 4.8 | 1575 | 14.7 | 32 | 7,800 | Fair to Good |
| B. Synthetics | | | | | | |
| Softwood Ligno-Novolak | 4.2 | 1375 | 15.7 | 24 | 7,500 | Fair |
| Hardwood Ligno-Novolak | 2.2 | 2000 | 13.0 | 26 | 7,000 | Fair to Good |

It will be seen from Table I that the ligno-novolak molding compounds made in accordance with the invention perform as well as the control in the molding tests, within the range of allowance recognized in the evaluation process, and satisfy minimum industry standard for materials of this sort. Moreover, the appearance of the molded articles is very desirable, with the samples made from the softwood lignin blend showing particularly excellent gloss.

with the prescribed ASTM conditions, the mold is unvented.

Utilizing the foregoing samples, the ligno-novolak molding compounds embodying the present invention are evaluated to determine certain of their properties using ASTM test procedures and specifications for Type II molding compounds. The results were as listed in Table II below.

TABLE II

PROPERTIES OF LIGNO-NOVOLAK MOLDING COMPOUNDS

| Property | ASTM Test No. | ASTM Type-II Specification | 25% Softwood Lignin-75% Durez Blend 19896 | 25% Hardwood Lignin*-75% Durez Blend 19896 | 25% Synthetic Softwood Resin | 25% Synthetic Hardwood Resin | Control Durez 19896 |
| --- | --- | --- | --- | --- | --- | --- | --- |
| Specific Gravity | D-792 | 1.40 MAX. | 1.37 | 1.37 | 1.39 | 1.38 | 1.36 |
| Mold Shrinkage, (%) | D-955 | 0.8 MAX. | 0.68 | 0.63 | 0.70 | 0.66 | 0.70 |
| Izod Impact, (ft.-lb.) | D-256 | — | 0.34 | 0.34 | 0.38 | 0.35 | 0.42 |
| Flexural Modulus (psi × 10$^6$) | D-790 | 1.0–1.2 | 1.11 | 1.14 | 1.16 | 1.12 | 1.10 |
| Flexural Strength (psi × 10$^3$) | D-790 | 9.00 MIN. | 8.70 | 9.90 | 9.59 | 11.30 | 9.62 |
| Heat Deflection Temperature, (°C.) | D-648 | — | 319 | 320 | 323 | 303 | 307 |
| Water Absorption, % Gain, 24 hrs. | D-570 | 0.8 MAX. | 0.65 | 0.67 | 0.75 | 0.65 | 0.52 |
| Water Absorption, | | | | | | | |

TABLE II-continued
PROPERTIES OF LIGNO-NOVOLAK MOLDING COMPOUNDS

| Property | ASTM Test No. | ASTM Type-II Specification | 25% Softwood Lignin-75% Durez Blend 19896 | 25% Hardwood Lignin*-75% Durez Blend 19896 | 25% Synthetic Softwood Resin | 25% Synthetic Hardwood Resin | Control Durez 19896 |
|---|---|---|---|---|---|---|---|
| % Gain, 7 weeks | D-570 | — | 8.84 | 9.25 | 10.0 | 8.58 | 8.15 |

*Recovered by acid precipitation at pH 3-4

It will be seen from Table II that the compounds produced in accordance with the present invention are at least equivalent and in some instances superior in basic properties when compared to compounds produced from commercial novolak resin in meeting ASTM Type II-molding compound specifications. For example, it can be concluded from the heat deflection temperature results that the molded compounds produced in accordance with the invention are suitable for uses in which the temperature demands are somewhat greater (10°-15° F.) than those in which the commercial novolak resin may be used.

The water absorption data indicated that the ligno-novolaks appear to absorb more water than the control initially. However, all samples including the control exhibited about the same weight gain and still maintained physical integrity after 7 weeks.

Resistance to boiling solvents is tested in accordance with ASTM D-543 using acetone, 95 percent ethanol, ethyl acetate, and toluene as solvents. All the ligno-novolak based samples, as well as the lignin-free control, were found to be similarly resistant to the solvents as measured by weight loss or gain. In addition, the dimensional changes are found to be insignificant for all samples tested.

EXAMPLE THREE

In view of the fact that novolak molding compounds find their major application in the electric and appliance industries, the electrical properties of the compounds are of primary importance. Filled resins produced in accordance with the procedure of Example Two and the filled Durez control were evaluated for electrical properties according to ASTM tests and specifications for Type-II molding compounds. The results were as reported in Table III which follows.

their electrical properties but, in some respects, they are dramatically and surprisingly superior. For example, the insulation resistance measures surface and internal electrical resistance at 500 volts. The ligno-novolak resins of the invention exhibit insulation resistance at a level of 12 to 62 times the minimum specified ASTM value and about 2 to 9 times greater than that of the control compound. Additionally, it can be seen that the ligno-novolaks are significantly superior to the novolaks in terms of the dielectric constant. Dissipation factor, arc resistance, and dielectric strength are found to be at least comparable and, in some instances, superior to those exhibited by the control novolak molding compounds. Within the moisture content range illustrated in the Table, there is no apparent effect on electrical properties.

EXAMPLE FOUR

The degree of crosslinking that is produced in molding compositions of the present sort has a profound effect upon many of the properties of the article produced, including its glass transition temperature, thermal stability, chemical resistance, etc., all of which characteristics improve with increasing levels of crosslinking. To maximize and optimize the properties of the ultimate product, it is therefore desirable that crosslinking occur to the greatest extent possible, and that all resins present in the molding compound be reacted; specifically, to achieve ultimate benefits it is necessary that the lignin react chemically with the phenol and the formaldehyde, and be crosslinked by the curing agent in the molding process. A most surprising aspect of the ligno-novolak blend formulations provided in accordance with the present invention resides in the fact that, notwithstanding that they are only physically blended with the novolak resin and are not reacted therewith

TABLE III
ELECTRICAL PROPERTIES OF LIGNO-NOVOLAK MOLDING COMPOUNDS

| Property | ASTM Test No. | ASTM Type II Specification | 25% Softwood Lignin - 75% Durez 19896 Blend | 25% Hardwood Lignin - 75% Durez 19896 Blend | 25% Softwood Synthetic Resin | 25% Hardwood Synthetic Resin | Control Durez 19896 |
|---|---|---|---|---|---|---|---|
| Insulation Resistance (500V) ohms × $10^{-10}$ | D-257 | 0.1 MIN. | 4.8 | 6.2 | 6.2 | 1.2 | 0.7 |
| Dielectric Constant | | | | | | | |
| 100 cps | | 7.0 MAX. | 5.8 | 5.3 | 5.9 | 6.3 | 7.2 |
| 1000 cps | D-150 | — | 5.3 | 4.9 | 5.4 | 5.3 | 6.0 |
| $10^6$ cps | | 5.0 MAX. | 4.5 | 4.2 | 4.5 | 4.4 | 4.8 |
| Dissipation Factor | | | | | | | |
| 100 cps | | 0.15 MAX. | 0.09 | 0.08 | 0.10 | 0.15 | 0.14 |
| 1000 cps | D-150 | — | 0.05 | 0.05 | 0.05 | 0.08 | 0.09 |
| $10^6$ cps | | 0.05 MAX. | 0.04 | 0.03 | 0.04 | 0.04 | 0.04 |
| Arc Resistance, Sec. | D-495 | — | 124 | 125 | 89 | 80 | 124 |
| Dielectric Strength, (V/Mil.) | | | | | | | |
| Short Time | D-149 | — | 360 | 370 | 390 | 400 | 421 |
| Step-By-Step | | 250 MIN. | 300 | 300 | 320 | 300 | 340 |
| Moisture Content, % | Karl Fisher Method | | 1.4 | 1.8 | 3.5 | 1.9 | 3.1 |

It will be seen from Table III that the ligno-novolak molding compounds produced in accordance with the present invention are not only satisfactory in general in prior to the curing process, a remarkably high level of crosslinking is exhibited in the cured product.

To demonstrate the foregoing, a 50:50 blend of the resin to be tested and wood flour is mixed with 15 weight percent of the hexamethylenetetramine curing agent, and cured by compression molding at 160° C. in a 2-inch disk mold. The chips produced are then ground to a fine powder, and digested in para-dioxane for a period of seven days, with occasional shaking of the container. At the end of the digestion period, each of the samples is filtered, dried, and weighed to determine the fraction that is insoluble in the para-dioxane solvent. The amount over 50% that is insoluble is indicative of the degree of crosslinking that has been attained in the resin since values up to 50% may be attributable to the insoluble wood flour fillers.

For purposes of comparison, parallel tests are conducted with products made from the ligno-novolak resins of the invention, with samples made from DUREZ 19896 alone (the same conventional novolak used in the lignin blends); and also with samples made from a synthetic ligno-novolak resin of the invention prepared as in Example One.

Utilizing the foregoing samples and extraction procedure, the percentages of crosslinking are determined, with the results set forth below:

| Sample No. | Filled Molding Compound | Percent Cross-linking |
|---|---|---|
| (1) | 25% Hardwood lignin (synthetic) | 98.21 |
| (2) | 25% Hardwood lignin (blend) | 98.15 |
| (3) | DUREZ (control) | 98.12 |
| (4) | 25% Softwood lignin (blend) | 98.09 |
| (5) | 25% Softwood lignin (synthetic) | 97.96 |
| (6) | 100% Hardwood lignin (without curing agent) | 51.6 |
| (7) | 25% Hardwood (blend) (without curing agent) | 64.0 |
| (8) | Kraft lignins (100% Softwood; 100% Hardwood; without curing agent; without filler) | 0.0 |
| (9) | Uncured Novolak (without curing agent; without filler) | 0.0 |

The data indicate that neither lignin nor novolak resin in the blends crosslinks to any significant extent in the absence of the curing agent (Samples 6, 7, 8 and 9). The ligno-novolak resins, both synthetic and blend derived, are highly crosslinked in the presence of curing agent.

The degree of crosslinking was also determined on the unfilled ligno-novolak resins using the same procedure as described hereinabove but substituting Durez-22091 for Durez-19896. The results were as follows:

| Sample No. | Unfilled Molding Compound | Insoluble (%) |
|---|---|---|
| (1) | 25% Hardwood Lignin (synthetic) | 91 |
| (2) | 25% hardwood lignin (blend) | 92 |
| (3) | Durez 22091 Control (cured) | 78 |
| (4) | Durez 22091 Control (uncured) | 0 |
| (5) | 25% Softwood Lignin (blend) | 91 |
| (6) | 25% Softwood Lignin (synthetic) | 94 |
| (7) | Softwood Kraft Lignin (without curing agent) | 0 |
| (8) | Hardwood Kraft Lignin (without curing agent) | 5 |

All ligno-novolaks were found to be highly crosslinked.

The data also indicate that the low molecular weight Durez novolak resin cures more readily with the lignin than by itself, whether the lignin is in the form of chemically bound interpolymer or a physical blend.

As can be seen from the foregoing data, the thermoset resins produced utilizing the blended novolaks of the present invention are crosslinked to substantially the same level as are the resins produced utilizing both the commercial novolak and also the synthetically produced ligno-novolak resins. Thus, it is evident that the lignin of the blended resins is not acting as a filler but is an integral part of the crosslinked structure. It is also evident that substantially the same result is obtained regardless of whether the lignin is initially present in the novolak as a chemically bound constituent, or in physically blended form. This indicates a surprising, and especially beneficial aspect of the present invention.

The ability to produce such products by blending, rather than by chemical synthesis, greatly facilitates resin manufacture. Thus, the ligno-novolaks are readily used in standard manufacturing operations, and neither reactors nor other special equipment need be provided.

As has been suggested hereinabove, phenol/formaldehyde thermoset resins of the present sort are normally filled to either enhance, or to provide, certain properties to the molding compound and the ultimate product. Typical fillers are wood flour, cotton linters, canvas, asbestos, mica, and the like. The nature of the filler will often dictate, or be dictated by, the application for which the resin is to be utilized; these factors are well known by those skilled in the art; and need not be discussed in detail.

Thus, it can be seen that the present invention provides novel formulations for producing thermoset ligno-novolak resins exhibiting desirable properties, and molding compounds utilizing the same, in which either a portion of the phenol content or the novolak resin content is provided by lignin. The formulations exhibit desirable processing and molding characteristics, and can be produced in a manner that is both convenient and also relatively inexpensive. While cost savings are normally realized by the practice of the invention, the ligno-novolaks are not "cheapened" as a result; their properties are generally comparable to those of conventional products and, indeed, they are superior in many respects.

We claim:

1. A phenolic resin formulation, comprising:
   (a) a ligno-novolak blend comprised of a physical admixture of:
      (1) about 50 to 95 weight percent of a novolak resin, and
      (2) about 50 to 5 weight percent of alkali lignin; and,
   (b) a curing agent for said novolak resin and said lignin in an amount sufficient to effect substantial crosslinking thereof.

2. The formulation of claim 1 wherein said novolak resin and lignin are present in said blend in amounts of about 75 to 90 percent and 25 to 10 percent, respectively.

3. The formulation of claim 1 wherein said novolak resin is produced from an aldehyde selected from the group consisting of formaldehyde, furfural and paraformaldehydes, reacted by acid catalysis with a stoichiometric excess of a phenol compound selected from the group consisting of phenol, cresol, cresylic acid and xylenol.

4. The formulation of claim 1 wherein said curing agent is a material capable of generating formaldehyde at elevated temperature and is present in an amount of about 5 to 20 percent, based upon the weight of said blend.

5. The formulation of claim 1 additionally including about 20 to 70 percent, based upon the weight of said blend, of an inert filler.

6. The formulation of claim 1 wherein said lignin has an ash content that does not exceed about 1 to 7 weight percent based on the weight of the total lignin.

7. The formulation of claim 6 wherein the blend comprises about 25 weight percent of lignin and wherein said ash content is about 3 percent or less.

8. A phenolic resin formulation, comprising:
(a) a ligno-novolak resin blend comprised of a physical admixture of:
(1) about 25 weight percent of an alkali lignin, the alkali lignin having been recovered from black liquor by acid precipitation and having an ash content of less than about 3% by weight; and
(2) about 75 weight percent of a novolak resin; and,
(b) about 5 to 20 percent, based on the weight of the resin blend, of hexamethylenetetramine.

9. A ligno-novolak molding composition that is capable, upon curing, of providing molding compounds exhibiting properties that are least comparable to those of molding compounds derived from novolak resins, comprising:
(a) a ligno-novolak selected from the group of:
(1) resin blends comprised of a physical admixture of about 50 to 95 weight percent of a novolak resin and about 50 to 5 weight percent of alkali lignin, and
(2) the reaction product of an aldehyde with a molar excess of a phenol in the presence of an acid catalyst wherein from about 5 to about 50 weight percent of the phenol has been replaced with an alkali lignin;
(b) a curing agent in an amount sufficient to effect substantial crosslinking of said ligno-novolak; and
(c) an inert filler.

10. A ligno-novolak molding composition as claimed in claim 9 wherein said ligno-novolak is a physical admixture of from about 75 to 90 percent novolak resin and about 25 to 10 percent of an alkali lignin.

11. A ligno-novolak molding composition as claimed in claim 10 wherein said curing agent is hexamethylenetetramine.

12. A ligno-novolak molding composition as claimed in claim 11 wherein said filler is selected from the group of wood flour, cotton linters, canvas, asbestos and mica.

13. A ligno-novolak molding composition that is capable, upon curing, of providing molding compounds exhibiting properties that are at least comparable to those of molding compounds derived from novolak resins, comprising:
(a) a ligno-novolak resin blend comprised of a physical admixture of about 75 to 90 percent of a novolak resin and 25 to 10 percent of an alkali lignin derived from black liquor;
(b) from about 5 to 20 percent, based on the weight of the resin blend, of hexamethylenetetramine curing agent; and
(c) an inert filler.

14. A ligno-novolak molding composition as claimed in claim 13 wherein said filler is wood flour.

15. A ligno-novolak molding composition that is capable, upon curing, of providing molding compounds exhibiting properties that are at least comparable to those of molding compounds derived from novolak resins, comprising:
(a) a ligno-novolak resin that is the reaction product of formaldehyde with a molar excess of phenol in the presence of an acidic catalyst wherein about 25 weight percent of the phenol has been replaced with an alkali lignin derived from black liquor;
(b) from about 5 to 20 percent, based on the weight of the resin, of hexamethylenetetramine curing agent; and
(c) an inert filler.

16. A ligno-novolak molding composition as claimed in claim 15 wherein said filler is wood flour.

17. A method for producing a ligno-novolak resin in which the lignin and novolak resin components are substantially coreacted and crosslinked which comprises:
(a) forming a physical mixture of a novolak resin capable of further polymerization or crosslinking with an alkali lignin derived by acid precipitation from black liquor; and
(b) combining said physical mixture with a curing catalyst in an amount sufficient to effect substantial crosslinking thereof.

18. A method for producing ligno-novolak resins as claimed in claim 17 wherein said curing agent is hexamethylenetetramine.

19. A method for producing ligno-novolak resins as claimed in claim 18 wherein the novolak resin is produced from an aldehyde selected from the group of formaldehyde, furfural and paraformaldehydes, reacted by acid catalysis with a stoichiometric excess of a phenol compound selected from the group of phenol, cresol, cresylic acid and xylenol.

20. A method for producing ligno-novolak resins, in which the lignin and novolak resin components are substantially coreacted and crosslinked, which comprises:
(a) forming a physical mixture of from about 70 to about 90 percent of a novolak resin capable of further polymerization or crosslinking with from about 30 to about 10 percent of an alkali lignin derived by acid precipitation from black liquor;
(b) subjecting said mixture to the action of a suitable mixing device for a period sufficient to provide a thoroughly mixed blend of the components;
(c) combining said blend with from about 5 to about 20 percent, based on the weight of the resin blend, of hexamethylenetetramine; and
(d) permitting said mixture to react to produce a coreacted and substantially crosslinked ligno-novolak resin.

* * * * *